(12) United States Patent
Andreev et al.

(10) Patent No.: US 7,716,306 B2
(45) Date of Patent: May 11, 2010

(54) DATA CACHING BASED ON DATA CONTENTS

(75) Inventors: Dmitry Andreev, Port Chester, NY (US); Marina A. Greenstein, Croton-on-Hudson, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1508 days.

(21) Appl. No.: 11/046,408

(22) Filed: Jan. 25, 2005

(65) Prior Publication Data

US 2006/0167969 A1 Jul. 27, 2006

(51) Int. Cl.
*G06F 15/16* (2006.01)
(52) U.S. Cl. ...................................... 709/219
(58) Field of Classification Search ................. 709/217, 709/219
See application file for complete search history.

(56) References Cited

U.S. PATENT DOCUMENTS 7,370,120 B2 * 5/2008 Kirsch et al. ............... 709/231
2003/0023671 A1 * 1/2003 Abdulrahiman et al. ...... 709/218
2003/0187923 A1 * 10/2003 Kimura et al. .............. 709/213
2003/0204613 A1 10/2003 Hudson et al.
2004/0078575 A1 4/2004 Morten et al.
2004/0093419 A1 5/2004 Weihl et al.
2006/0031520 A1 * 2/2006 Bedekar et al. ............. 709/227

* cited by examiner

*Primary Examiner*—Larry Donaghue
(74) *Attorney, Agent, or Firm*—Schmeiser, Olsen & Watts; John R. Pivnichny

(57) ABSTRACT

A novel method and structure in which data caching is based on data contents. The method comprises the steps of (a) sending a data request from a processing circuit to a target server; (b) in response to the target server receiving the data request, sending a first response portion of a data response from the target server to the processing circuit; and (c) in response to the processing circuit receiving the first response portion, using the processing circuit to examine the first response portion so as to determine whether the processing circuit contains a copy of the data response; and (d) in response to the processing circuit determining that the processing circuit contains a copy of the data response, sending the copy of the data response from the processing circuit to a client machine.

24 Claims, 4 Drawing Sheets

DATA CACHING BASED ON DATA CONTENTS

BACKGROUND OF THE INVENTION

1. Technical Field

The present invention relates to data caching, and more particularly, to compressed Internet data caching based on data contents.

2. Related Art

Typically, from time to time, a client machine may request identical data using different URLs (Uniform Resource Locator). For example, a PC (personal computer) may request a first web page from a first website and later request a second web page from a second website, wherein the first and second web pages contain identical pieces of information (e.g., identical pictures). As a result, the same data will be sent to the PC twice, resulting in a waste of network bandwidth.

As a result, there is a need for a method and structure, in which identical pieces of information at different URLs are sent to the client machine in a way that uses less network (internet) bandwidth than in the prior art.

SUMMARY OF THE INVENTION

The present invention provides a method, comprising the steps of (a) sending, by a proxy server, a data request to a target server; and (b) in response to the proxy server receiving a first response portion of a data response from the target server, examining, by the proxy server, the first response portion so as to determine whether a data storage device contains a copy of the data response.

The present invention also provides a computer program product, comprising a computer usable medium having a computer readable program code embodied therein, said computer readable program code comprising an algorithm adapted to implement a method for data transfer, said method comprising the steps of (a) sending, by a proxy server, a data request to a target server; and (b) in response to the proxy server receiving a first response portion of a data response from the target server, examining, by the proxy server, the first response portion so as to determine whether a data storage device contains a copy of the data response.

The present invention also provides a method for deploying computing infrastructure, comprising integrating computer-readable code into a computing system, wherein the code in combination with the computing system is capable of performing the steps of (a) sending, by a proxy server, a data request to a target server; and (b) in response to the proxy server receiving a first response portion of a data response from the target server, examining, by the proxy server, the first response portion so as to determine whether a data storage device contains a copy of the data response.

The present invention also provides method, comprising the steps of (a) sending, by a proxy server, a data request to a target server, (b) in response to the target server receiving the data request, sending, by the target server, a data packet of a data response to the proxy server, (c) in response to the proxy server receiving the data packet, examining, by the proxy server, a header of the data packet so as to determine whether the data response is of a compressed graphic format; (d) in response to the proxy server determining that the data response is of the compressed graphic format, examining, by the proxy server, the header so as to determine whether the data response comprises more than one packet; and (e) in response to the proxy server determining that the data response comprises more than one packet, examining, by the proxy server, a data portion of the data packet so as to determine whether a data storage device contains a copy of the data response.

The present invention also provides a method and structure, in which identical pieces of information at different URLs are sent to a client machine in a way that uses less network (internet) bandwidth than in the prior art.

DETAILED DESCRIPTION OF THE INVENTION

File (or data) compression is an art of substituting long, repeating sequences of bytes in the file by a short reference to a dictionary. The short reference to the dictionary is referred to as the compressed file. The inventors of the present invention have observed that if two beginning portions of two well-compressed files are identical, the two well-compressed files are also identical. "Well compressed" means data cannot be substantially compressed any further. For instance, a JPEG file is well-compressed (JPEG is a digital image format from Joint Photographic Experts Group). In other words, the inventors of the present invention finds that a beginning portion of a well-compressed file can uniquely and correctly identify the entire well-compressed file. As a result, the present invention can be generally stated in a context of a communication between a proxy server and a target server as follows. When the proxy server receives only a beginning portion of a response from the target server, the proxy server can determine whether the response is a well-compressed file. If so, the proxy server can use the beginning portion to search in a look-up table to determine whether the proxy server contains a cached copy of the response. If so, the proxy server can terminate communication with the target server and therefore save connection bandwidth of the network connection between the target server and the proxy server. Different embodiments of the present invention will be discussed infra.

Figure 1:
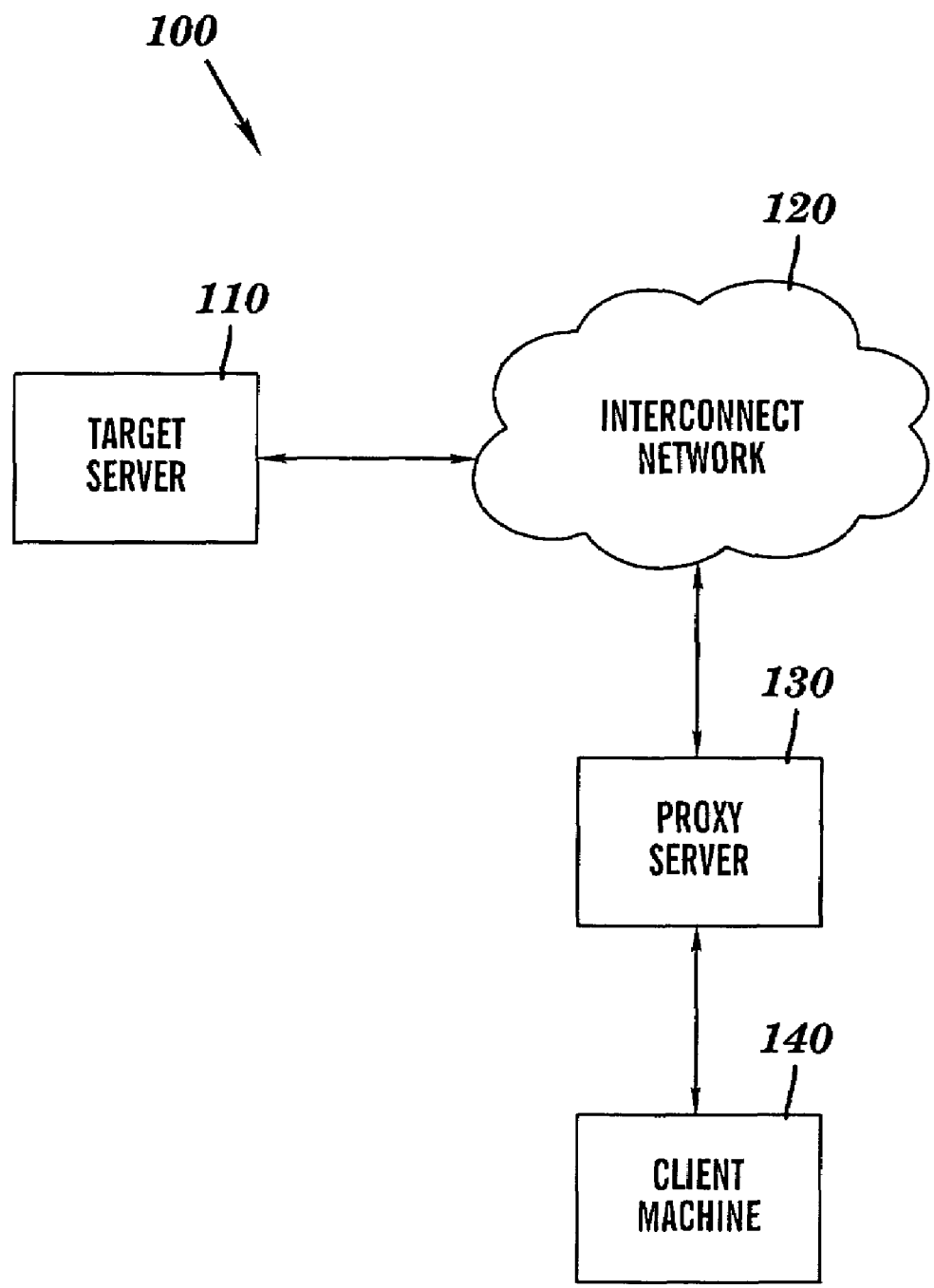
FIG. 1 illustrates a system, in accordance with embodiments of the present invention.
Figure 2:
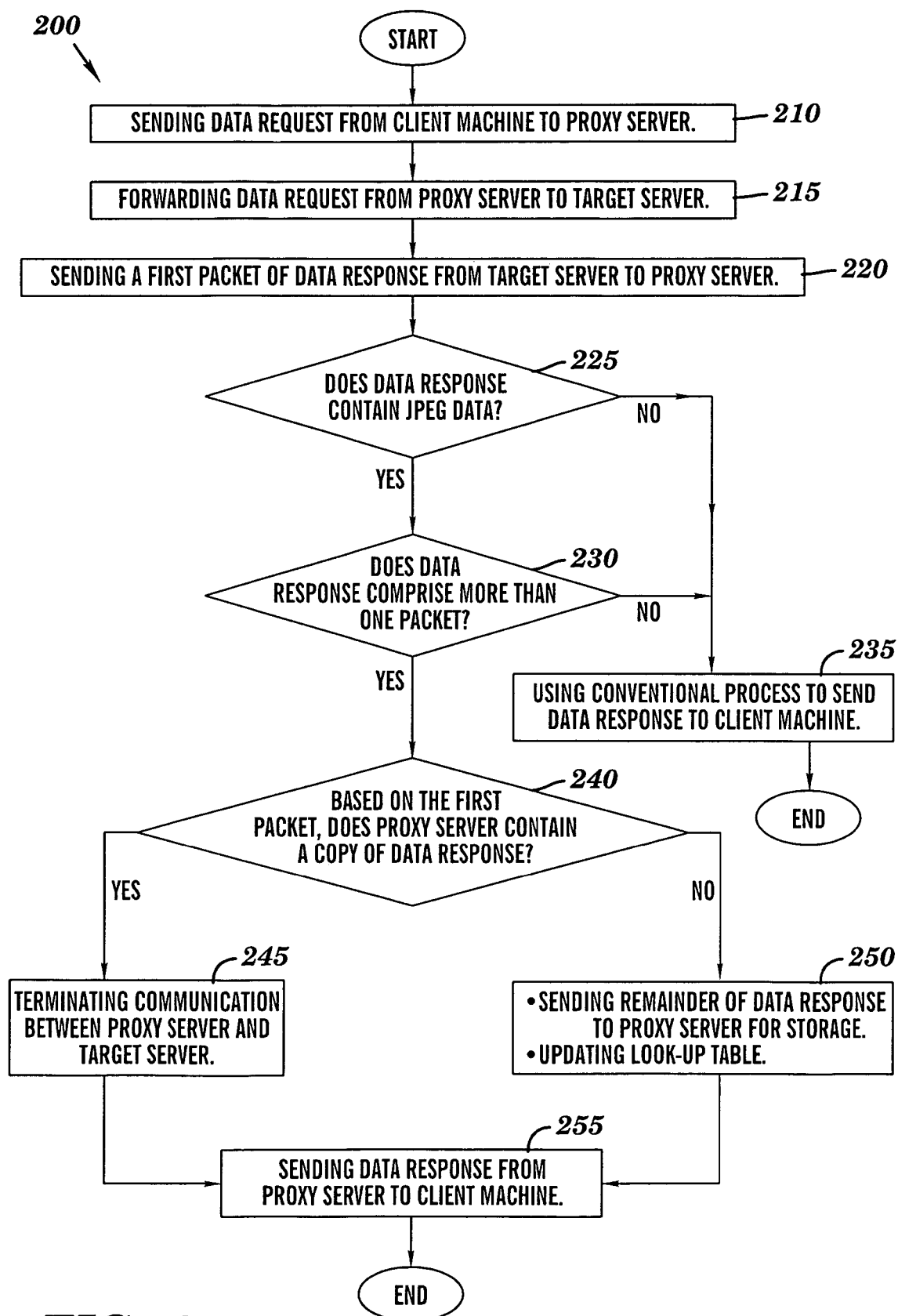
FIG. 2 illustrates a flow chart of a method for operating the system of FIG. 1, in accordance with embodiments of the present invention.

FIG. 1 illustrates a system 100, in accordance with embodiments of the present invention. The system 100 can illustratively comprise a target server 110, an interconnect network (e.g., the internet) 120, a proxy server 130, and a client machine 140. FIG. 2 illustrates a flow chart of a method 200 for operating the system 100 of FIG. 1, in accordance with embodiments of the present invention.

With reference to FIGS. 1 and 2, the method 200 can start with a step 210 in which the client machine 140 sends a data request to the proxy server 130. The data request specifically indicates the target server 110 as the destination of the data request.

Next, in step 215, in response to receiving the data request from the client machine 140, the proxy server 130 forwards the data request to the target server 110 via the interconnect network 120.

Next, in step 220, in response to receiving the data request from the proxy server 130, the target server 110 sends the first packet of the data response to the proxy server 130 via the interconnect network 120.

Figures 3A, 3B:
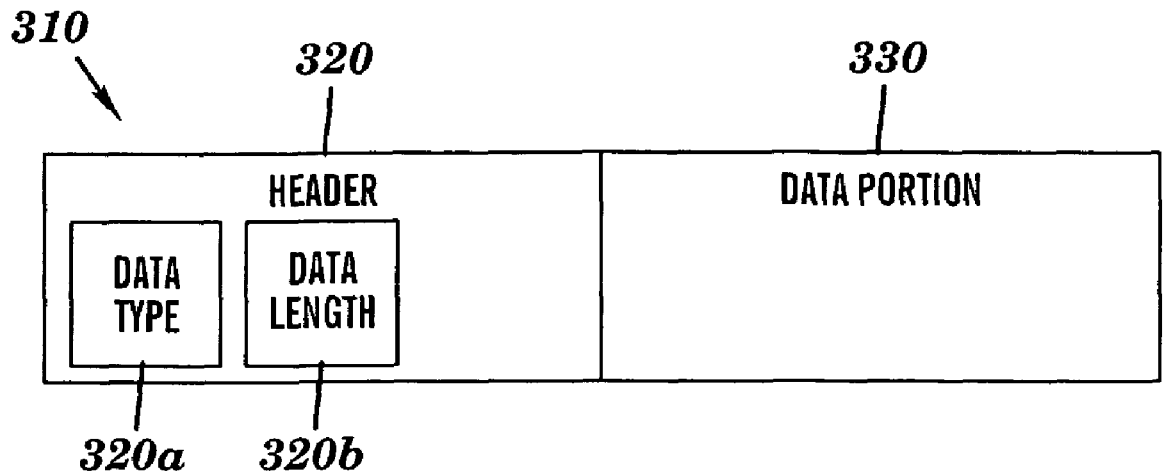
FIG. 3A illustrates a packet that can be transmitted in the system of FIG. 1, in accordance with embodiments of the present invention.
FIG. 3B illustrates a look-up table that can be used with the system of FIG. 1, in accordance with embodiments of the present invention.

Next, in step 225, in response to receiving the first packet, the proxy server 130 determines whether the data response contains, illustratively, JPEG data. In one embodiment, the interconnect network 120 can comprise the internet, and the first packet conforms to the TCP/IP protocol (Transmission Control Protocol/Internet Protocol). FIG. 3A illustrates one embodiment of the first packet (hereafter referred to the first packet 310). The first packet 310 can comprise a header 320 and a data portion 330. The proxy server 130 can determine whether the data response contains JPEG data by examining a data type field 320a of the header 320 of the first packet 310.

With reference back to FIGS. 1 and 2, if the proxy server 130 determines that the data response does not contain JPEG data, the method 200 can proceed to step 235. In step 235, the data response can be sent from the target server 110 to the client machine 140 using any conventional process. For instance, in step 235, the target server 110 can send the remainder of the data response to the proxy server 130 via the interconnect network 120. Then, the proxy server 130 can forward the entire data response (i.e., the first packet and the remainder of the data response) to the client machine 140.

In step 225, if the proxy server 130 determines that the data response contains JPEG data, the method 200 can proceed to step 230. In step 230, the proxy server 130 further determines whether the data response contains more than one packet. The proxy server 130 can determine whether the data response contains more than one packet by examining the data-length field 320b (FIG. 3A) of the header 320 of the first packet 310.

If the proxy server 130 determines that the data response contains only one packet (i.e., the first packet), the method 200 can proceed to step 235. In step 235, the data response can be sent to the client machine 140 using any conventional process. For instance, the proxy server 130 can simply forward the entire data response (i.e., the first packet) to the client machine 140.

In step 230, if the proxy server 130 determines that the data response contains more than one packet, the method 200 proceeds to step 240. In step 240, the proxy server 130 determines whether the proxy server 130 contains a cached copy of the data response by examining the first packet.

More specifically, the proxy server 130 can maintain a look-up table 360 (FIG. 3B) which contains multiple entries. Each entry of the look-up table 360 (FIG. 3B) comprises a signature and an associated data response address of a data response which the proxy server 130 has earlier received and stored. The way in which the proxy server 130 builds and updates the look-up table 360 (FIG. 3B) will be described later. For now, in step 240, the proxy server 130 can apply a Hash function to the first N bytes of the data portion of the first packet so as to generate a signature, wherein N is a pre-specified positive integer. N should not be too small, else there is a high likelihood of the proxy server 130 providing incorrect data response to the client machine 140. In addition, N should not be larger than the maximum size of a packet less the header size. N can be in a range of 1,000 d-1,300 d (d=decimal).

Next, the proxy server 130 can search the look-up table 360 (FIG. 3B) for any currently existing signature which is identical to the just generated signature. If there is a hit (i.e., match), the proxy server 130 can determine that the proxy server 130 already contains a cached copy of the data response. As a result, the proxy server 130 can send a communication termination message to the target server 110 (step 245) so as to terminate the communication between the proxy server 130 and the target server 110, and thus prevent the target server from sending the subsequent packets of the data response, eventually saving the Internet bandwidth. Then, the proxy server 130 can send a cached copy of the data response (which the proxy server 130 has earlier stored) to the client machine 140 (step 255).

For example, assume that the proxy server 130 finds that signature 1 in the look-up table 360 (FIG. 3B) is identical to the just generated signature (step 240). As a result, the proxy server 130 can determine that the proxy server 130 contains a cached copy of the data response. Then, the proxy server 130 can send the communication termination message to the target server 110 (step 245) and can send the associated data response 1 (stored at the data response 1's address) to the client machine 140 (step 255). Here, the proxy server 130 provides the client machine 140 with a cached copy of the data response 1 without receiving the entire data response from the target server 110 via the interconnect network 120. As a result, the bandwidth of the interconnect network 120 (or the internet 120, in one embodiment) can be used for other communications.

Figure 4:
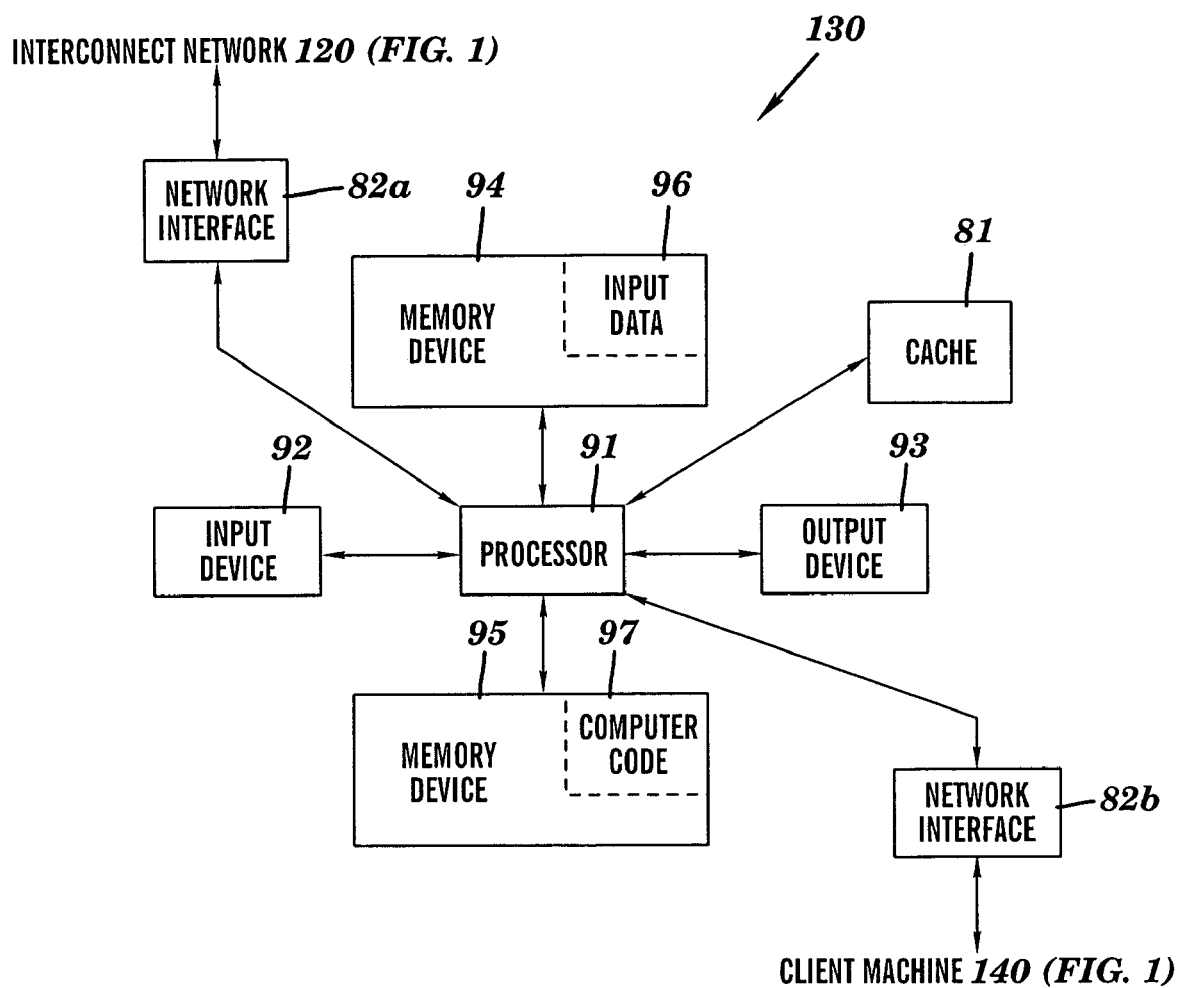
FIG. 4 illustrates one embodiment of a proxy server of the system of FIG. 1, in accordance with embodiments of the present invention.

FIG. 4 illustrates one embodiment of the proxy server 130 of FIG. 1. The proxy server 130 comprises a processor 91, an input device 92 coupled to the processor 91, an output device 93 coupled to the processor 91, memory devices 94 and 95 each coupled to the processor 91, a cache 81 coupled to the processor 91, and network interfaces 82a and 82b each coupled to the processor 91.

In one embodiment, the cache 81 can be used to store the data responses which the proxy server 130 has received. The look-up table 360 (FIG. 3B) can be stored in the memory devices 94 and 95 or in the cache 81. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for performing the tasks of the proxy server 130 of FIG. 130. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the proxy server 130 may comprise said computer usable medium (or said program storage device).

While FIG. 4 shows the proxy server 130 as a particular configuration of hardware and software, any configuration of hardware and software, as would be known to a person of ordinary skill in the art, may be utilized for the purposes stated supra in conjunction with the particular proxy server 130 of FIG. 4. For example, the memory devices 94 and 95 may be portions of a single memory device rather than separate memory devices.

With reference back to FIGS. 1 and 2, again in step 240, if there is no match (i.e., all the currently existing signatures in the look-up table 360 (FIG. 3B) are different from the just generated signature), then the proxy server 130 can determine that the proxy server 130 does not contain a cached copy of the data response. Then, the proxy server 130 can receive the remainder of the data response from the target server 110 (step 250) and store the entire data response in, illustratively, its cache 430 (FIG. 4). In addition, in step 250, the proxy server 130 can update the look-up table 360 (FIG. 3B) by adding a new entry in the look-up table 360 (FIG. 3B). The signature field of the new entry can contain the just generated signature, and the data response address field of the new entry can contain the address of the data response in the cache 430 (FIG. 4). Then, the proxy server 130 can send a copy of the data response to the client machine 140 (step 255).

The embodiments above are for illustration only. In general, in response to receiving a data request from the proxy server 130, the target server 110 can send only a portion of the requested data response to the proxy server 130. The proxy server 130 then examines the portion of the data response to determine whether the proxy server 130 contains a cached copy of the data response. If the proxy server 130 determines that the proxy server 130 contains a cached copy of the data response, the proxy server 130 terminates communication with the target server 110 and sends a cached copy of the data response to the client machine 140. If the proxy server 130 determines that the proxy server 130 does not contain a cached copy of the data response, then the proxy server 130 (a) receives the remainder of the data response from the target server 110, (b) stores the entire data response, (c) updates the look-up table 360 (FIG. 3B) accordingly, and (d) sends a copy of the data response to the client machine 140.

The present invention is not limited to the above embodiments. With reference to FIG. 1, the proxy server 130 can be included in the client machine 140. For instance, a PC (personal computer) running a web browser can utilize this embodiment. That is, if after receiving a portion of a web server's data response, the PC finds that the PC has a cached copy of the web server's data response, the PC can use the cached copy of the data response which the PC has earlier stored without downloading the entire data response from the web server via the internet.

In the embodiments described above, the present invention may help save connection bandwidth if the data portions of the data response is in JPEG format (step 225 of FIG. 2). The present invention actually helps save connection bandwidth if the method 200 (FIG. 2) proceeds through the steps 225, 230, 240, 245, and 255. In general, the present invention may help save connection bandwidth if the data portions of the data response are in any data format in which a portion of the data response uniquely identifies the entire data response. This is the case when the data portion of the data response is of a compressed graphic format such as JPEG. A file is considered to be of a compressed graphic format if a portion of the file uniquely identifies the entire file.

In the embodiments above, signatures are used in the look-up table 360 (FIG. 3B). Alternatively, any value that can be uniquely associated with the data response can be used. For instance, the M first bits (M being a positive integer) of the data portion of the first packet received from the target server 110 can be used to identify the associated data response stored by the proxy server 130 (FIG. 1). Accordingly, each entry of the look-up table 360 (FIG. 3B) can comprise an M-first-bits field and a data response address field, wherein the M-first-bits field contains the M first bits of the data portion of the first packet of the associated data response.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method for processing a data request, said method comprising:

a proxy server receiving the data request from a client machine;

responsive to said proxy server receiving the data request from the client machine, said proxy server sending the data request to a target server;

after said proxy server sending the data request to the target server, said proxy server receiving from the target server a first data packet of the data response;

after said proxy server receiving the first data packet of the data response, said proxy server determining that the data response has a compressed graphic format and said proxy server determining that the data response comprises more than one data packet, said more than one data packet consisting of the first data packet and additional data packets;

responsive to said proxy server determining that the data response has the compressed graphic format and to said proxy server determining that the data response comprises said more than one data packet, said proxy server determining that the proxy server comprises a cached copy of the data response;

responsive to said proxy server determining that the proxy server comprises said cached copy of the data response, said proxy server terminating communication with the target server to prevent the target server from sending to the proxy server the additional data packets of the data response; and responsive to said proxy server terminating communication with the target server, said proxy server sending the cached copy of the data response to the client machine.

2. The method of claim 1, wherein said proxy server determining that the data response comprises said more than one data packet is performed in response to said proxy server determining that the data response has the compressed graphic format.

3. The method of claim 1, wherein said proxy server determining that the data response has the compressed graphic format includes said proxy server determining from a data type field of a header of the first data packet that the data response has the compressed graphic format, and wherein said proxy server determining that the data response comprises said more than one data packet includes said proxy server determining from a data length field of the header of the first data packet that the data response comprises said more than one data packet.

4. The method of claim 1, wherein said determining that the proxy server comprises said cached copy of the data response comprises:

said proxy server generating a signature from initial bytes of a data portion of the first data packet of the data response; and said proxy server matching the generated signature to a signature in a list of signatures in a look-up table stored in a memory device of the proxy server.

5. The method of claim 4, wherein said generating the signature comprises applying a hash function to the initial bytes.

6. The method of claim 4, wherein the initial bytes consist of N bytes, and wherein N is in a range of 1000 to 1300.

7. A computer program product, comprising a computer readable storage medium having a computer readable program code stored therein, said computer readable program code containing instructions configured to be executed by a processor of a proxy server to implement a method for processing a data request, said method comprising:

said proxy server receiving the data request from a client machine;

responsive to said proxy server receiving the data request from the client machine, said proxy server sending the data request to a target server, after said proxy server sending the data request to the target server, said proxy server receiving from the target server a first data packet of the data response;

after said proxy server receiving the first data packet of the data response, said proxy server determining that the data response has a compressed graphic format and said proxy server determining that the data response comprises more than one data packet, said more than one data packet consisting of the first data packet and additional data packets;

responsive to said proxy server determining that the data response has the compressed graphic format and to said proxy server determining that the data response comprises said more than one data packet, said proxy server determining that the proxy server comprises a cached copy of the data response;

responsive to said proxy server determining that the proxy server comprises said cached copy of the data response, said proxy server terminating communication with the target server to prevent the target server from sending to the proxy server the additional data packets of the data response; and responsive to said proxy server terminating communication with the target server, said proxy server sending the cached copy of the data response to the client machine.

8. The computer program product of claim 7, wherein said proxy server determining that the data response comprises said more than one data packet is performed in response to said proxy server determining that the data response has the compressed graphic format.

9. The computer program product of claim 7,
wherein said proxy server determining that the data response has the compressed graphic format includes said proxy server determining from a data type field of a header of the first data packet that the data response has the compressed graphic format, and wherein said proxy server determining that the data response comprises said more than one data packet includes said proxy server determining from a data length field of the header of the first data packet that the data response comprises said more than one data packet.

10. The computer program product of claim 7, wherein determining that the proxy server comprises said cached copy of the data response comprises:

said proxy server generating a signature from initial bytes of a data portion of the first data packet of the data response; and said proxy server matching the generated signature to a signature in a list of signatures in a look-up table stored in a memory device of the proxy server.

11. The computer program product of claim 10, wherein said generating the signature comprises applying a hash function to the initial bytes.

12. The computer program product of claim 10, wherein the initial bytes consist of N bytes, and wherein N is in a range of 1000 to 1300.

13. A computing system comprising a proxy server, said proxy server comprising a processor and a computer readable memory unit coupled to the processor, said memory unit containing program code configured to be executed by the processor to implement a method for processing a data request, said method comprising:

said proxy server receiving the data request from a client machine;

responsive to said proxy server receiving the data request from the client machine, said proxy server sending the data request to a target server, after said proxy server sending the data request to the target server, said proxy server receiving from the target server a first data packet of the data response;

after said proxy server receiving the first data packet of the data response, said proxy server determining that the data response has a compressed graphic format and said proxy server determining that the data response comprises more than one data packet, said more than one data packet consisting of the first data packet and additional data packets;

responsive to said proxy server determining that the data response has the compressed graphic format and to said proxy server determining that the data response comprises said more than one data packet, said proxy server determining that the proxy server comprises a cached copy of the data response;

responsive to said proxy server determining that the proxy server comprises said cached copy of the data response, said proxy server terminating communication with the target server to prevent the target server from sending to the proxy server the additional data packets of the data response; and responsive to said proxy server terminating communication with the target server, said proxy server sending the cached copy of the data response to the client machine.

14. The computing system of claim 13, wherein said proxy server determining that the data response comprises said more than one data packet is performed in response to said proxy server determining that the data response has the compressed graphic format.

15. The computing system of claim 13,
wherein said proxy server determining that the data response has the compressed graphic format includes said proxy server determining from a data type field of a header of the first data packet that the data response has the compressed graphic format, and wherein said proxy server determining that the data response comprises said more than one data packet includes said proxy server determining from a data length field of the header of the first data packet that the data response comprises said more than one data packet.

16. The computing system of claim 13, wherein said determining that the proxy server comprises said cached copy of the data response comprises:

said proxy server generating a signature from initial bytes of a data portion of the first data packet of the data response; and said proxy server matching the generated signature to a signature in a list of signatures in a look-up table stored in a memory device of the proxy server.

17. The computing system of claim 16, wherein said generating the signature comprises applying a hash function to the initial bytes.

18. The computing system of claim 16, wherein the initial bytes consist of N bytes, and wherein N is in a range of 1000 to 1300.

19. A process for deploying computing infrastructure, said process comprising integrating computer-readable code into a proxy server, wherein the code in combination with the proxy server is configured to perform a method for processing a data request, said method comprising:

said proxy server receiving the data request from a client machine;

responsive to said proxy server receiving the data request from the client machine, said proxy server sending the data request to a target server, after said proxy server sending the data request to the target server, said proxy server receiving from the target server a first data packet of the data response;

after said proxy server receiving the first data packet of the data response, said proxy server determining that the data response has a compressed graphic format and said proxy server determining that the data response comprises more than one data packet, said more than one data packet consisting of the first data packet and additional data packets;

responsive to said proxy server determining that the data response has the compressed graphic format and to said proxy server determining that the data response comprises said more than one data packet, said proxy server determining that the proxy server comprises a cached copy of the data response;

responsive to said proxy server determining that the proxy server comprises said cached copy of the data response, said proxy server terminating communication with the target server to prevent the target server from sending to the proxy server the additional data packets of the data response; and responsive to said proxy server terminating communication with the target server, said proxy server sending the cached copy of the data response to the client machine.

20. The process of claim 19, wherein said proxy server determining that the data response comprises said more than one data packet is performed in response to said proxy server determining that the data response has the compressed graphic format.

21. The process of claim 19, wherein said proxy server determining that the data response has the compressed graphic format includes said proxy server determining from a data type field of a header of the first data packet that the data response has the compressed graphic format, and wherein said proxy server determining that the data response comprises said more than one data packet includes said proxy server determining from a data length field of the header of the first data packet that the data response comprises said more than one data packet.

22. The process of claim 19, wherein said determining that the proxy server comprises said cached copy of the data response comprises:

said proxy server generating a signature from initial bytes of a data portion of the first data packet of the data response; and said proxy server matching the generated signature to a signature in a list of signatures in a look-up table stored in a memory device of the proxy server.

23. The process of claim 22, wherein said generating the signature comprises applying a hash function to the initial bytes.

24. The process of claim 22, wherein the initial bytes consist of N bytes, and wherein N is in a range of 1000 to 1300.

* * * * *